E. F. BISHOP.
STRAW CUTTER.
No. 44,507. Patented Oct. 4, 1864.
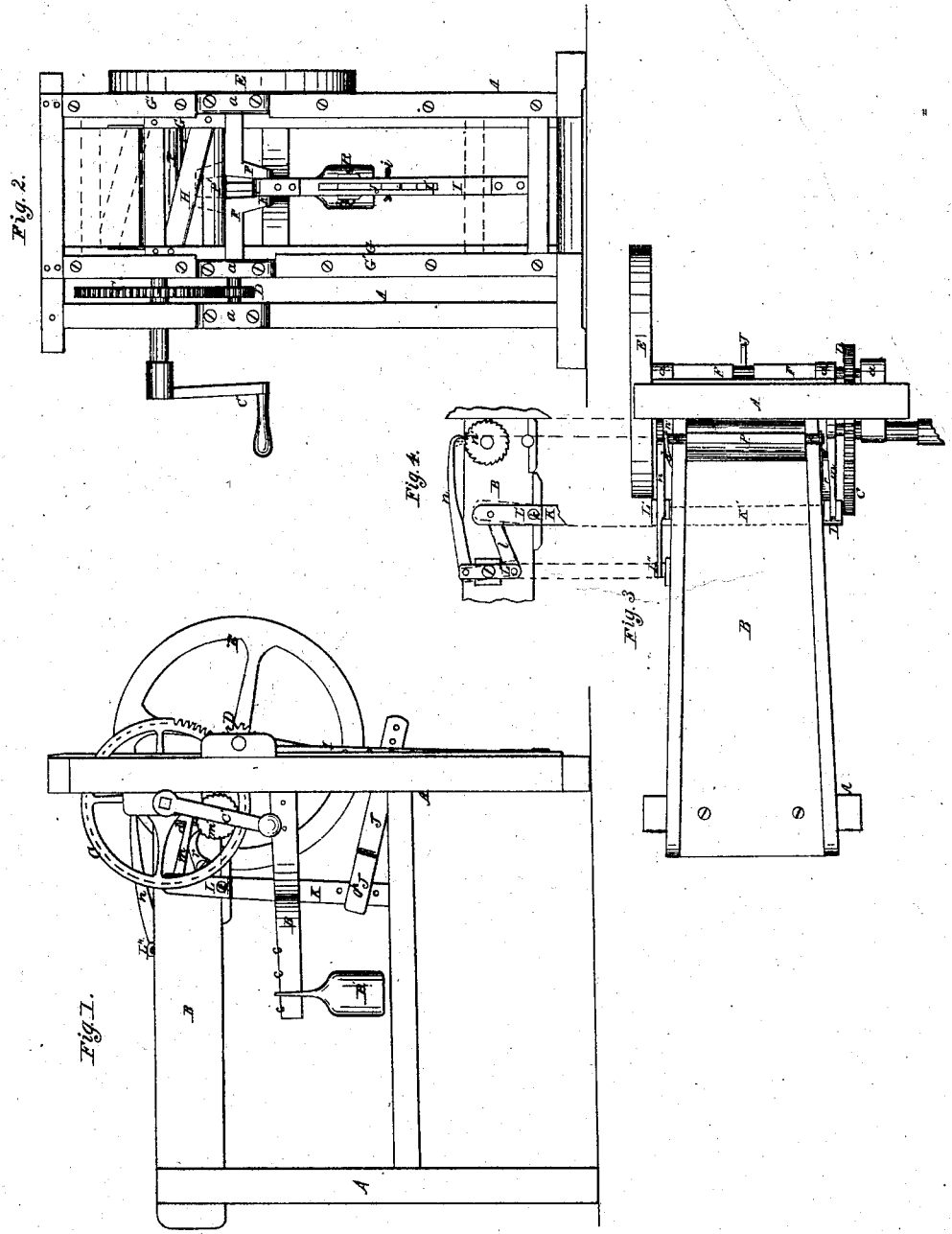
Witnesses:
Inventor:
E F Bishop

UNITED STATES PATENT OFFICE.

E. F. BISHOP, OF BURTON, OHIO.

STRAW-CUTTER.

Specification forming part of Letters Patent No. 44,507, dated October 4, 1864.

*To all whom it may concern:*

Be it known that I, E. F. BISHOP, of Burton, in the county of Geauga and State of Ohio, have invented certain new and useful Improvements in Straw-Cutters; and I do hereby declare that the following is a full and complete description of the construction and operation of the same, reference being had to the accompanying drawings, making a part of this specification, in which—

Figure 1 is a side view. Fig. 2 is an end view. Fig. 3 is a top view. Fig. 4 represents a section.

Like letters of reference refer to like parts in the several views.

A represents the frame of the machine: B, a straw or cutter-box of the usual form. C is the driving-wheel operated by the crank C', and works in the pinion D on the end of the crank-shaft F, a balance-wheel, E, being on the other end of the shaft. This shaft is supported and turns in the bearings $a$, secured to the frame.

G is a gate moving vertically in slots in the guide-frame G', being operated by means of the connecting-rod I, secured to the lower end of the gate, and connected to the crank F' on the crank-shaft, as represented. H is the blade or cutter, arranged diagonally across the upper end of the gate.

In the connecting-rod I is a slot, I', through which the end of the arm or connecting-rod J passes and is attached by the pin $i$. The other end of the rod widens out at J' and is slotted in the middle, through which the end of the lever K passes and is secured by the pin $h$. The lever K has its fulcrum in a shaft underneath the cutter-box, (indicated by the dotted lines K' in Fig. 3,) and to the ends or journals $k$ of this shaft are secured the arms L and L', to which the pawls $m$ and $n$ are connected, that operate the ratchet-wheels $m'$ $n'$ on the ends of the feeding-rollers. These rollers are arranged one above the other in the end of the cutter-box near the blade. The upper roller, P, is fluted, for the purpose of more effectually carrying the straw or hay between the rollers. The journals $p$ of this roller rest and turn in slotted openings in the sides of the box, so that it can be raised more or less by the pressure of the straw between the rollers. The roller is kept down with sufficient weight upon the straw by means of a weighted lever, R, underneath the box, with which it is connected by rods $d$, extending from the journals $p$ to the sides of the forked end of the lever. This end of the lever is hinged to the frame, and on the other end is placed the weight R', that can be moved either way, increasing or diminishing the pressure of the roller on the straw, as the nature of the case may require.

The roller P is revolved in the desired manner by means of the ratchet-wheel $n'$ on the journal at one end, and pawl $n$, that is moved back and forth by the lever K, the lever receiving its motion from the crank-shaft by means of the connecting-rods I J. The pawl $n$ is connected to the vibrating arm L' by a connecting rod or arm, $l$, extending between the arm L' and lever L'', (seen in Fig. 4,) to which the pawl is attached. The object of this double lever is to revolve the upper roller in the proper direction.

The lower roller, P', (seen in Fig. 2,) moves simultaneously with the upper roller and is turned by the vibrating arm L on the other side of the box, moving the pawl $m$ in the ratchet-wheel $m'$ on the end of the roller. $r$ is a dog to prevent a reaction of the rollers.

In operating this straw-cutter, by turning the crank-handle C', the driving-gear revolves the crank-shaft that moves the gate up and down in the guide-frame operating the knife, and the movement of the shaft that raises the gate and knife, as indicated by the dotted lines in Fig. 2, turns the feeding-rollers in the desired manner by means of the connecting-rods I and J, connected to the lever K and operating it as described, which turns the feeding-rollers so as to move the hay or straw out before the cutter descends, feeding in the most uniform manner the straw to the cutter. The length of the feed is regulated by adjusting the arm J up or down in the connecting-rod I and also in the lever K, there being holes in both and in the arm J for that purpose. (Shown in Fig. 1.) The nearer the arm or adjustable connecting-rod J is moved toward the crank-shaft, the greater stroke will be given to the lever K, turning the feed-rollers, accordingly increasing the length of the feed, and the further the adjustable rod J is moved from the center of motion, the less stroke will be given to the lever and rollers. Thus the feeding apparatus can be adjusted to cut hay, straw, or cornstalks uniformly any desired length; and the pressure of the fluted roller on the hay or straw is regulated by moving the weight R' in the notches c of the lever, as described, and the connecting-rods d can also be adjusted in the sides of the lever for the same purpose.

What I claim as my improvement, and desire to secure by Letters Patent, is—

The connecting-rod I, arm J, lever K, gate G, in combination with the rollers P P', ratchet-wheels m' n', pawls m n, arm l, lever L'', weighted lever R, and rods d d, when arranged and operating conjointly, as and for the purpose set forth.

E. F. BISHOP.

Witnesses:
  P. HITCHCOCK,
  H. H. FORD.